US010814469B2

(12) United States Patent
Schulz et al.

(10) Patent No.: US 10,814,469 B2
(45) Date of Patent: Oct. 27, 2020

(54) HAND-GUIDED POWER TOOL

(71) Applicant: Andreas Stihl AG & Co. KG, Waiblingen (DE)

(72) Inventors: Andreas Schulz, Ettlingen (DE); Przemyslaw Zurek, Backnang (DE); Matthias Harer, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 251 days.

(21) Appl. No.: 15/728,754

(22) Filed: Oct. 10, 2017

(65) Prior Publication Data
US 2018/0117755 A1 May 3, 2018

(30) Foreign Application Priority Data

Oct. 31, 2016 (EP) .................................... 16400049

(51) Int. Cl.
| B25F 5/00 | (2006.01) |
| B25F 5/02 | (2006.01) |
| B27B 17/00 | (2006.01) |
| B23D 57/02 | (2006.01) |

(52) U.S. Cl.
CPC ............... *B25F 5/006* (2013.01); *B25F 5/02* (2013.01); *B27B 17/00* (2013.01); *B23D 57/023* (2013.01)

(58) Field of Classification Search
CPC ........... B25F 5/006; B25F 5/02; B25D 57/023
See application file for complete search history.

(56) References Cited

U.S. PATENT DOCUMENTS

| 4,641,715 A * | 2/1987 | Stinson | E02D 11/00 173/129 |
| 5,209,196 A * | 5/1993 | Nickel | F02D 11/02 123/179.18 |
| 6,871,623 B2 * | 3/2005 | Ohsawa | F02M 1/02 123/179.18 |

(Continued)

FOREIGN PATENT DOCUMENTS

| CN | 102 672 688 | 9/2012 |
| CN | 105 798 851 | 7/2016 |

(Continued)

*Primary Examiner* — Thanh K Truong
*Assistant Examiner* — David G Shutty
(74) *Attorney, Agent, or Firm* — Gudrun E. Huckett

(57) ABSTRACT

A power tool has a handle operatively connected with vibration damping across a vibration gap to a drive motor with throttle element. An actuating device on the handle actuates the throttle element pivotably supported in a housing. A coupling element bridging the vibration gap connects actuating device to throttle element. The actuation movement of the actuation device is transmitted as rotation about an axis transverse to the vibration gap. An intermediate element is pivotably supported on an actuating element connected to the throttle element. The coupling element acts on the intermediate element and, over part of the actuation movement, contacts a contact region of the intermediate element. A guide for the intermediate element changes a position of the contact region relative to the housing based on a rotational position of the actuating element by changing a pivot position of the intermediate element relative to the housing.

12 Claims, 6 Drawing Sheets

(56) References Cited

U.S. PATENT DOCUMENTS

| | | | |
|---|---|---|---|
| 7,269,904 B2 * | 9/2007 | Schmidt | B27B 17/00 173/170 |
| 7,958,946 B2 * | 6/2011 | Kurzenberger | B25F 5/006 173/170 |
| 8,408,525 B2 * | 4/2013 | Grater | F02D 11/04 261/47 |
| 8,511,650 B2 * | 8/2013 | Kern | F02D 11/04 261/52 |
| 8,695,951 B2 * | 4/2014 | Omarsson | F02M 19/04 261/41.5 |
| 8,739,894 B2 | 6/2014 | Schlauch et al. | |
| 9,528,450 B2 * | 12/2016 | Kurzenberger | F02D 29/00 |
| 9,604,296 B2 * | 3/2017 | Seki | B27B 17/083 |
| 9,636,792 B2 * | 5/2017 | Mandalka | B23Q 11/0089 |
| 9,689,126 B2 | 6/2017 | Barth et al. | |
| 2008/0277130 A1 | 11/2008 | Kurzenberger et al. | |
| 2009/0064504 A1 | 3/2009 | Kodama et al. | |
| 2014/0174772 A1 | 6/2014 | Mandalka et al. | |

FOREIGN PATENT DOCUMENTS

| | | | |
|---|---|---|---|
| CN | 106 050 406 | | 10/2016 |
| DE | 44 07 432 | | 9/1995 |
| DE | 202010007114 | * 11/2010 | ............ B27B 17/00 |
| DE | 202010007114 U1 | * 11/2010 | ............ B25F 5/008 |
| DE | 20 2010 007 114 U1 | | 12/2010 |

* cited by examiner

HAND-GUIDED POWER TOOL

BACKGROUND OF THE INVENTION

The invention relates to a hand-guided power tool comprising a drive motor, a tool that is driven by the drive motor, and at least one handle that is operatively connected by vibration-damping means across a vibration gap with the drive motor. At the handle, an actuating device for a throttle element of the drive motor is arranged wherein the throttle element is pivotably supported about an axis of rotation in a housing. The actuating device is operatively connected by a coupling element with the throttle element, wherein the coupling element bridges the vibration gap and transmits the actuation movement of the actuating device as a rotary movement about an axis of rotation that is arranged transverse to the vibration gap. An actuating element is connected to the throttle element. The coupling element is acting on an intermediate element which is pivotably supported on the actuating element about a pivot axis, wherein the coupling element over at least part of the actuation movement of the actuating device is contacting a contact region of the intermediate element.

US 2008/0277130 A1 discloses a hand-guided power tool that comprises a handle and a casing in which the internal combustion engine is arranged. The handle and the casing are connected to each other by a vibration gap that permits relative movements of the casing relative to the handle. At the handle, an actuating device, i.e., a throttle trigger, for actuating a throttle element of a carburetor is arranged. The actuation movement, i.e., the pivot movement of the throttle trigger, is transmitted by a transmission element to the carburetor. The transmission element transmits the pivot movement of the throttle trigger as a rotary movement about an axis of rotation which is positioned transverse to the vibration gap.

In case of an unfavorable position of the carburetor and unfavorable relative movements, a displacement of a contact region may occur due to the relative movements of the handle relative to the carburetor. In the contact region the transmission element is acting on an actuating element at the carburetor, for example, a throttle lever. This displacement, despite the transmission of the actuation movement by a rotary movement about an axis which is positioned transverse to the vibration gap may cause actuations of the throttle element. The actuations of the throttle element may result, for example, from guiding and advancing forces that are introduced by an operator via the handle as well as from vibrations.

DE 20 2010 007 114 U1 already discloses a pivotable support of the actuating element which is acted on by the coupling element. In order to enable an adjustment of the actuating characteristics, it is also provided here that the actuating element comprises a slider guide that is acted on by the coupling element.

It is an object of the invention to provide a hand-guided power tool of the aforementioned kind with which an improved transmission of the actuation movement on the throttle element can be achieved.

SUMMARY OF THE INVENTION

This object is solved for a hand-guided power tool in that a guide structure for the intermediate element is provided that changes the position of the contact region relative to the housing as a function of the rotational position of the actuating element by changing the pivot position of the intermediate element relative to the housing.

In order to provide for a good adjustment of the position of the contact region relative to the axis of rotation of the throttle element, a guide structure is provided for the intermediate element. The guide structure changes the position of the contact region relative to the housing as a function of the rotational position of the actuating element by changing the pivot position of the intermediate element relative to the housing. By suitable configuration and matching of the guide structure to the structural arrangement comprised of intermediate element, of actuating element, and of coupling element, a desired transmission characteristic can be adjusted in a simple way. Preferably, in this context a decoupling as much as possible of the transmission movement from relative movements between housing and motor across the vibration gap is achieved.

Advantageously, the guide structure attributes to each position of the pivot axis of the intermediate element at the actuating element a rotational position of the intermediate element about the pivot axis.

The intermediate element comprises advantageously a lateral projecting section, wherein the coupling element is contacting the side of the lateral projecting section which is facing the pivot axis of the intermediate element. For actuation of the actuating element, the coupling element exerts preferably a pulling force on the intermediate element, i.e., moves away from the axis of rotation of the throttle element for opening the throttle element. Advantageously, the lateral projecting section upon actuation of the actuating element also moves away from the axis of rotation of the throttle element. In a position of the carburetor relative to the coupling element in which the contact region moves away from the axis of rotation of the throttle element when the actuating element is actuated, i.e., an opening movement of the throttle element is carried out, an adjustment of the position of the contact region by means of a guide structure for the intermediate element is particularly advantageous.

The throttle element is advantageously pivotably supported about the axis of rotation between a first end position and a second end position. Preferably, the first end position is the substantially or completely closed position of the throttle element correlated with idle. The second end position is preferably the substantially or completely open position correlated with full load.

Advantageously, the coupling element is rotatably supported. It is particularly advantageous when the coupling element is rotatably supported on a rotary bearing which is fixedly connected to the housing of the throttle element. By supporting the coupling element on a rotary bearing which is fixedly connected with the housing of the throttle element, relative movements between the bearing location of the coupling element and the housing can be avoided in a simple way. Preferably, the rotary bearing is immediately embodied on the housing of the throttle element or on a flange which is fixedly secured on the housing. In this way, manufacturing tolerances existing between the bearing location and the throttle element can be kept minimal. The rotary bearing is in particular integrally formed on the housing or on the flange. A simple configuration results when the flange is made of plastic material. Preferably, a rotary bearing receptacle for the coupling element is integrally formed on the flange.

The location of the rotary bearing is fixedly predetermined on the housing so that relative movements between housing and handle can only cause pivot movements of the coupling element about the rotary bearing. In this way, the effect of relative movements on the actuation movement of the throttle element can be minimized.

Advantageously, the guide structure is a slider guide. The slider guide comprises a guide path and a slider that is guided in the guide path. By a suitable configuration of the guide path, a desired pivoting characteristic of the intermediate element relative to the actuating element can be obtained. The guide path and the slider form a first guide part and a second guide part. In this context, the guide path can be the first guide part and the slider can be the second guide part. Alternatively, the slider can be the first guide part and the guide path can be the second guide part. The first guide part is advantageously connected fixedly with the housing of the throttle element. The second guide part is embodied on the intermediate element. Preferably, the first guide part which is connected fixedly with the housing is the slider and the second guide part which is embodied on the intermediate element is the guide path. However, it can also be provided that the slider is formed on the intermediate element and the guide path is fixedly connected with the housing.

The guide path is advantageously embodied so as to be partially open at least at one end. At the at least one partially open end of the guide path, the slider is advantageously not guided. However, it can be advantageous to design the guide path so as to be only partially open so that the slider cannot move out of the guide path. At the at least partially open end of the guide path, the guide path has advantageously a through hole at a peripheral wall forming the guide path. In this way, dirt which collects in operation at the guide path can be conveyed by the slider through the opening out of the guide path. Preferably, the end of the guide path which is usually positioned at the bottom in operation is embodied at least partially open so that contaminants (dirt) can fall through the opening out of the guide path, also as a result of the force of gravity.

Advantageously, the slider in at least one end position of the throttle element has a spacing relative to the correlated end of the guide path. Since the slider does not move all the way to the end of the guide path, tolerances can be compensated. Moreover, even in case of soiling of the guide path, it can be ensured that the throttle element can reach its correlated end position and is not prevented from reaching this end position by contaminants in the guide path. Preferably, the end of the guide path which in the usual operating position is at the top is designed such that this end, in the correlated end position of the throttle element in which the slider is closest to this end of the guide path, has a spacing relative to the slider.

In order to prevent that the slider due to vibrations can become detached from the guide path, it is provided that the slider has a securing section. The securing section holds the slider in the guide path. Preferably, the securing section engages behind the guide path at least at a first longitudinal side of the guide path and secures the guide path in the direction of the pivot axis of the intermediate element on the slider. In order to enable a simple installation of the intermediate element on the housing and to ensure at the same time a good positional securing action by the securing section, it is provided that the securing section has a first long side whose length is greater than the width of the guide path and that the securing section has a second short side whose length is smaller than the width of the guide path. By means of the short side, the slider can be mounted on the intermediate element when the securing section is proper alignment. In order to ensure that the intermediate element cannot become detached from the slider in any position in operation, it is provided that the second side in no position of the intermediate element between the first end position and the second end position of the throttle element is oriented perpendicular to the longitudinal direction of the guide path. Advantageously, the width of the guide path in each position of the intermediate element between the first end position and the second end position is smaller than the width of the securing section that is measured in the same direction as the width of the guide path so that the securing section in operation cannot slip through the guide path opening but is secured with form fit at the guide path. The securing section extends in this context advantageously only to one side of the intermediate element.

The guide path comprises advantageously a second longitudinal side. The slider is thus guided on both sides. The slider is guided advantageously with clearance between the two longitudinal sides of the guide path. In this way, blocking of the slider by contaminants (dirt) on the guide path is avoided. Advantageously, an elevation is arranged at the guide path adjacent to the second longitudinal side of the guide path. The elevation increases the stability of the guide path and of the entire intermediate element. On the second longitudinal side, the guide path is preferably not engaged from behind by a securing section of the slider so that the guide path at the second longitudinal side can be embodied with an elevated configuration relative to the first longitudinal side. The second longitudinal side of the guide path thus has a greater width, measured in longitudinal direction of the slider and transverse to the securing section, than the first longitudinal side.

Advantageously, the slider is contacting the guide path on a contact line. In this context, the linear contact surface between the slider and the guide path is preferably provided in each position of the slider. The contact line refers in this context to the line where the slider is in contact with one of the longitudinal sides of the guide path when the slider is resting against one of the longitudinal sides of the guide path. Upon contact of a straight longitudinal side with a parallel-guided flat slider, the slider and the guide path can be in contact with each other at a contact surface. Since not only a point contact is thereby provided, an increased stability is achieved. Due to the linear contact of slider and guide path, contaminants are easily conveyed out of the guide path in longitudinal direction of the guide path.

Advantageously, the intermediate element can be mounted in only one position on the actuating element; this position is correlated with the second end position of the throttle element. The second end position in this context is the completely open position of the throttle element. The intermediate element therefore can be mounted or demounted on the actuating element only in the completely open position of the throttle element. Usually, the throttle element is spring-loaded in the direction toward its first end position, i.e., in the direction of the completely closed position. In order to adjust the throttle element from the first end position into the second end position, the coupling element must exert a force on the intermediate element, in particular a pulling force. In the second end position, the mounting location of the intermediate element on the actuating element is therefore under tension. In the non-actuated first end position of the throttle element, no actuating force is acting by means of the intermediate element on the actuating element. In a start position of the arrangement, there is advantageously also no actuating force acting by means of the intermediate element on the actuating element. The mounting location of the intermediate element at the actuating element is selected such that mounting or demounting is possible only in the second end position of the throttle element. In this way, an accidental detachment of the intermediate element from the actuating element, in particular in connection with the first end position of the throttle element when no or only little force is transmitted by the intermediate element on the actuating element, is avoided.

The first end position of the throttle element is advantageously a closed position of the throttle element. The first end position can also be a start position of the throttle element in which the throttle element can be secured, for example, by an operating mode selector or a locking device. The intermediate element comprises advantageously a locking contour which in the first end position of the throttle element interacts with the actuating element. It has been found that the intermediate element in operation may be excited to carry out movements due to vibrations. Such a movement of the intermediate element in unfavorable situations can effect a movement of the actuating element. Due to the locking contour, the movement of the intermediate element relative to the actuating element is limited so that, in particular in case of vibrations, no unimpeded excitation of the intermediate element is possible anymore. In this way, it can be avoided that the movement of the intermediate element due to vibrations can become so great that a transmission of the movement to the actuating element occurs.

One embodiment of the invention will be explained in the following with the aid of the drawings in more detail.

DESCRIPTION OF THE PREFERRED EMBODIMENTS

Figure 1:
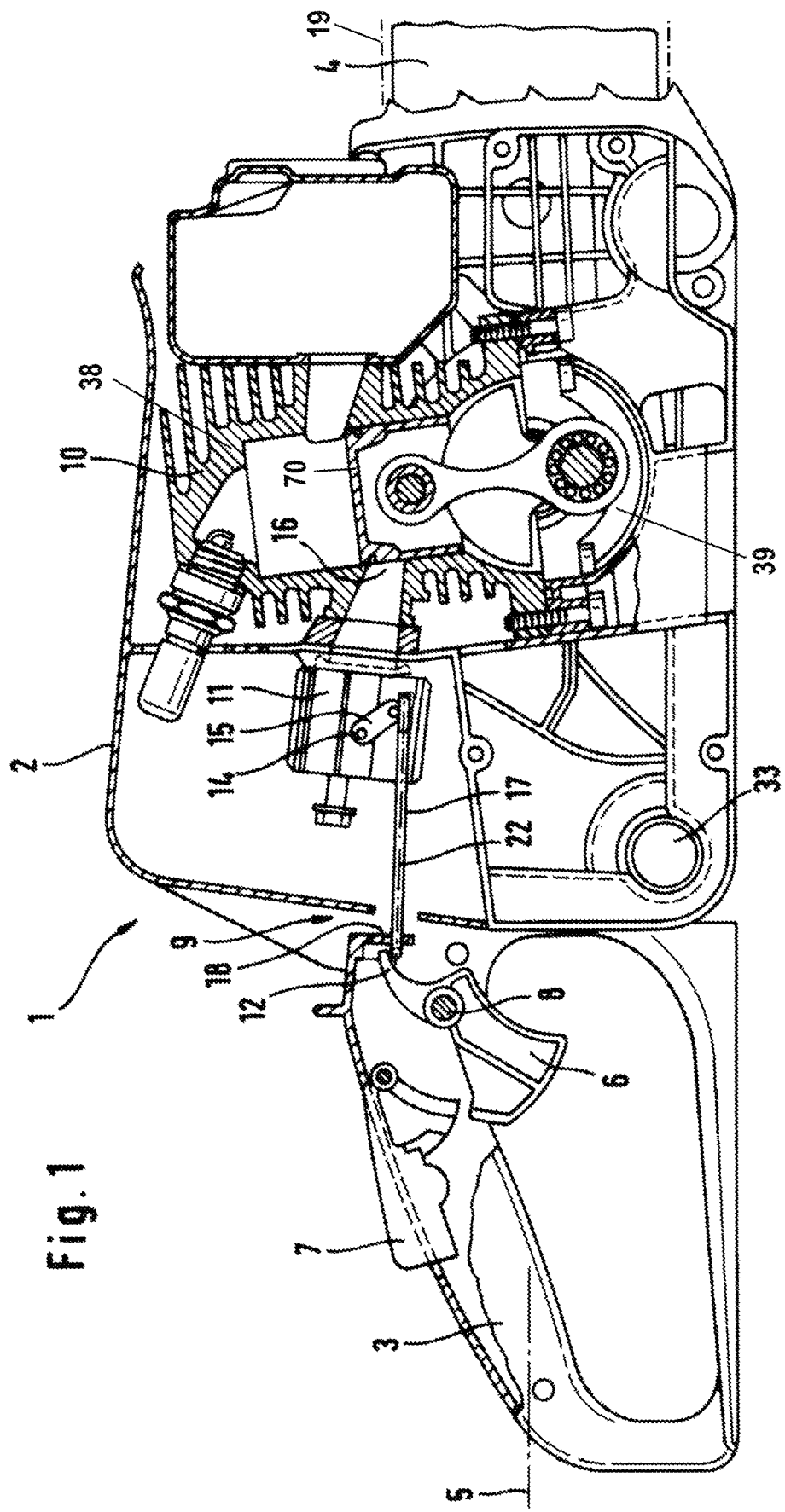
FIG. 1 is a schematic illustration of a motor chainsaw.

FIG. 1 shows a motor chainsaw 1 as an embodiment of a hand-guided power tool. The hand-guided, advantageously hand-carried, power tool may however also be another type of power tool such as a cut-off machine or a similar device. The invention is advantageously usable in hand-guided power tools in which an actuating device and a throttle element are separated from each other by a vibration gap so that in operation relative movements between the actuating device and the throttle element may occur that may falsify or modify the transmission of the actuation movement of the actuating device to the throttle element. The illustration in FIG. 1 is only schematic and illustrates the general configuration of the motor chainsaw 1.

The motor chainsaw 1 comprises a casing 2 with a handle 3 secured thereto. The handle 3 is secured by a plurality of antivibration elements 33 on the casing 2 of which only one is schematically illustrated in FIG. 1. The handle 3 is advantageously part of a handle casing where also further components of the motor chainsaw 1, such as a fuel tank or the like, can be integrated.

In the embodiment, the handle 3 is a rear handle. At the side of the casing 2 which is facing away from the rear handle 3, a guide bar 4 is projecting forwardly. The tool, i.e., a schematically illustrated saw chain 19, of the motor chainsaw 1 is guided on the guide bar 4. In operation, the saw chain 19 is driven in circulation about the guide bar 4 by a drive motor 10. The drive motor 10 is an internal combustion engine, advantageously a two-stroke engine or a mixture-lubricated four-stroke engine. In the embodiment, the drive motor 10 is a two-stroke engine. The drive motor 10 is advantageously a single cylinder engine. Through a carburetor 11, the drive motor 10 sucks in a fuel/air mixture that is supplied through an inlet 16 into a crankcase 39. The inlet 16 is controlled by piston 70. The piston 70 is reciprocatingly supported in a cylinder 38 of the drive motor 10. In the carburetor 11, a throttle element, not illustrated in FIG. 1, is pivotably supported with a throttle shaft 14. An actuating element 15 is secured on the throttle shaft 14. Preferably, the actuating element 15 is fixedly secured on the throttle shaft 14.

On the handle 3, an actuation device, i.e., a throttle trigger 6, is pivotably supported by means of a pivot bearing 8. A throttle trigger lock 7 is also supported on the handle 3. The actuation movement of the throttle trigger 6, in the embodiment the pivot movement of the throttle trigger 6, is transmitted by a coupling element 17 to the actuating element 15 at the carburetor 11. Between the handle 3 and the casing 2, a vibration gap 9 is formed which is bridged by the antivibration elements 33. Due to the vibration gap 9, the handle 3 and the casing 2 in operation can perform relative movements relative to each other. In this way, the handle 3 is vibration-decoupled from the drive motor 10. In order to achieve a good transmission of the actuation movement of the throttle trigger 6 to the actuating element 15 and the throttle element 23 despite possible relative movements, the coupling element 17 transmits the actuation movement of the throttle trigger 6 as a rotary movement about an axis of rotation 22 which is positioned transverse to the vibration gap 9. In the embodiment, the axis of rotation 22 coincides with the longitudinal center axis of the coupling element 17 in the area which is bridging the vibration gap 9.

The motor chainsaw 1 comprises a longitudinal axis 5, which is extending parallel to the plane of the guide bar 4 in the longitudinal direction of the motor chainsaw 1. In the embodiment, the coupling element 17 is positioned at an angle α (FIG. 5) of less than 45° at a slant to the longitudinal axis 5, in particular approximately parallel to the longitudinal axis 5. Advantageously, the longitudinal axis of the coupling element 17, in particular the axis of rotation 22, is positioned relative to the longitudinal axis 5 only at a minimal angle α which is advantageously less than 30°, in particular less than 20°. As also shown in FIG. 1, the throttle trigger 6 comprises an actuation arm 12 with which it is acting on the coupling element 17. Immediately adjacent to the actuation arm 12, the coupling element 17 is supported pivotably by a first rotary bearing 18 on the handle 3.

Figure 2:
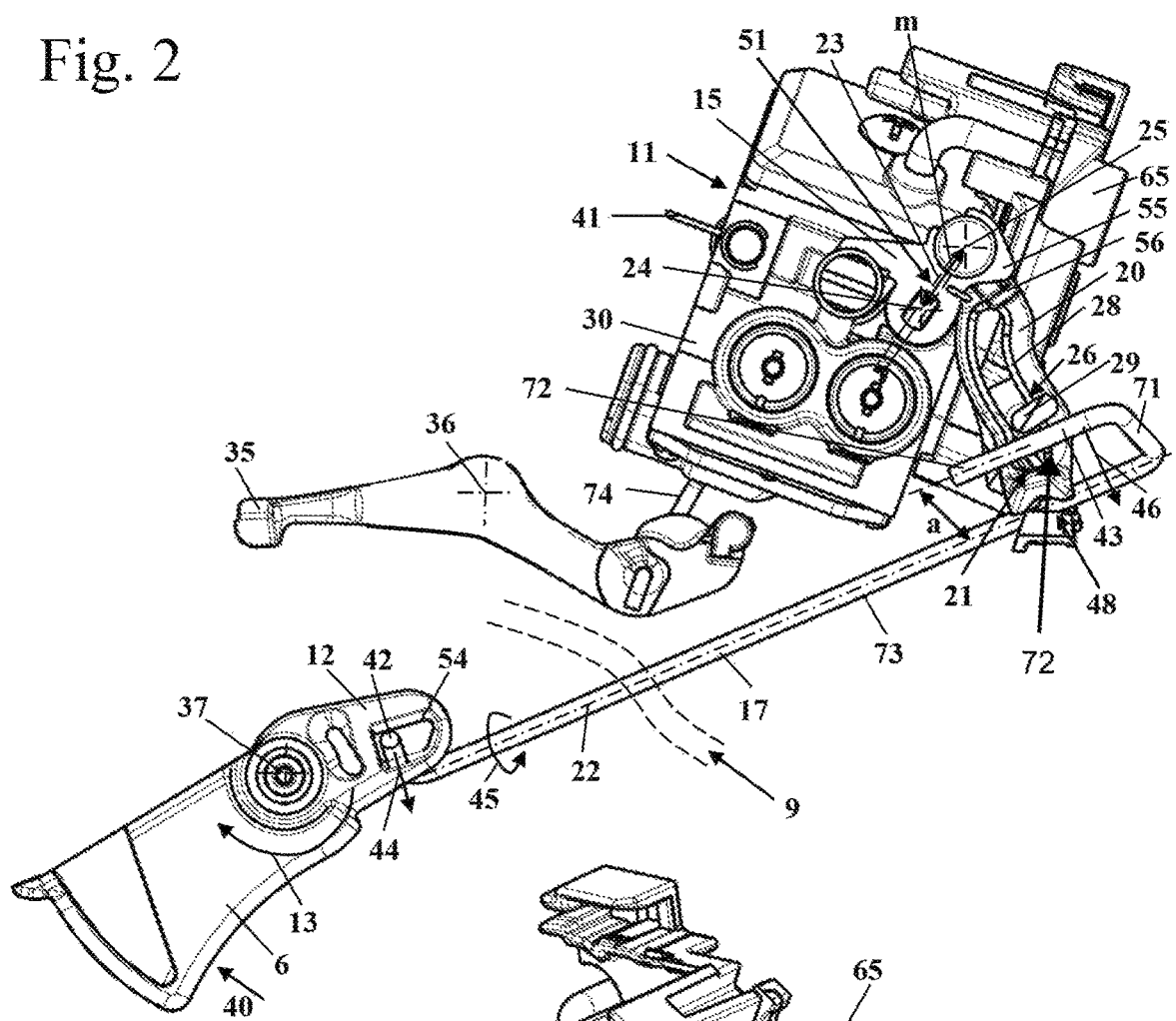
FIG. 2 is a side view of carburetor, coupling element, and throttle trigger of the motor chainsaw of FIG. 1 in idle position.

As shown in FIG. 2, the coupling element 17 is pivotably supported by a second rotary bearing 48 in the area of the carburetor 11. The second rotary bearing 48 is connected with a housing 30 of the carburetor 11. The first rotary bearing 18 is not shown in FIG. 2. In FIG. 2, the position of the vibration gap 9 is also illustrated schematically.

The throttle trigger 6 is pivotably supported on pivot axis 37 and is spring-loaded in the direction of the idle position shown in FIG. 2. In the embodiment, the actuation arm 12 comprises an opening 54 in which an actuation section 42 of the coupling element 17 is mounted. In the area of the carburetor 11, the coupling element 17 comprises a contact section 43 which is interacting with an intermediate element 20. The intermediate element 20 is pivotably supported on actuating element 15 about pivot axis 25. The pivot axis 25 comprises in this context a spacing m relative to an axis of rotation 24 of the throttle element 23. The throttle element 23 is arranged in an intake passage of the drive motor 10 and serves for controlling the quantity of combustion air which is supplied to the drive motor 10. When the throttle element 23, as shown in the embodiment, is arranged in a carburetor 11, the throttle element 23 also controls the quantity of fuel supplied to the drive motor 10 because the throttle element 23 has an effect on the vacuum in the intake passage and thus the quantity of sucked-in fuel. However, it can also be provided that the throttle element 23 is arranged in a throttle housing and the supply of fuel is realized at a different location, for example, immediately into the intake passage, into the crankcase 39, or into the cylinder 38 of the drive motor 10.

In the idle position illustrated in FIG. 2, the throttle element 23, in the embodiment a throttle flap, is in a first end position 51. In the first end position 51, the throttle element 23 substantially closes off the flow cross section in the intake passage. In the first end position 51, the smallest free flow cross section in the intake passage is provided. As also shown in FIG. 2, a choke element 41 is supported upstream of the throttle element 23. The choke element 41 is completely open in idle position. The choke element 41 substantially completely opens the flow cross section in the completely open position. The motor chainsaw 1 comprises an operating mode selector 35 that is supported pivotably about pivot axis 36 at the casing 2 (FIG. 1). The operating mode selector 35 serves for selecting at least one start position and acts by means of an actuating rod 74 on the choke element 41. The operating mode selector 35 acts advantageously also on the throttle element 23 and adjusts the throttle element 23 and the choke element 41 into beneficial start positions for the starting operation of the drive motor 10.

When the operator actuates the throttle trigger 6 for opening the throttle element 23 in the direction of arrow 40 (see also FIG. 5), the throttle trigger 6 is pivoted about pivot axis 37, as indicated by arrow 13. In this context, the actuation arm 12 and thus also the actuation section 42 arranged in the opening 54 are moving in the direction of arrow 44. In the embodiment, the arrows 40 and 44 are oppositely oriented to each other. The actuation section 42 is formed as a projecting arm that is projecting laterally away from the axis or rotation 22 of the coupling element 17. The movement of the actuation section 42 in the direction of arrow 44, which is caused by the pivot movement of the throttle trigger 6 in the direction of arrow 13 (FIG. 2), effects thereby a rotary movement of the coupling element 17 about the axis of rotation 22 in the direction of arrow 45. The contact section 43 is arranged on a second end section 72 of the coupling element 17 which is connected to a straight bridging section 73 by a first end section 71. In the embodiment, the axis of rotation 22 is the longitudinal center axis of the bridging section 73. In the embodiment, the second end section 72 is extending parallel to the bridging section 73 at a spacing a to the bridging section 73. The contact section 43 also has a spacing a relative to the bridging section 73. The contact section 43 has a spacing a relative to the axis of rotation 22 (see FIGS. 2, 3, 4). The rotary movement of the coupling element 17 effects in this way a movement of the contact section 43 in the direction of arrow 46.

In the embodiment, the actuation section 42 and the first end section 71 that supports the contact section 43 project approximately in the same radial direction relative to the axis of rotation 22 so that the actuation section 42 and the first end section 71 with the contact section 43 move in the same direction. However, an opposite movement of actuation section 42 relative to end section 71 and contact section 43 can be advantageous.

As also shown in FIG. 2, the contact section 43 in idle position has a minimal spacing relative to a contact region 21 of the intermediate element 20. In this way, tolerances can be compensated. The contact region 21 is the region of the intermediate element 20 where the contact section 43 will contact when an actuation movement occurs. The actuation movement is realized advantageously from the first end position 51 up to a second end position 52 which is correlated with the completely open position of the throttle element 23. In this context, intermediate positions can be assumed when performing the actuation movement from the first end position 51 to the second end position 52. The actual region of contact where the contact section 43 is in contact with the intermediate element 20 in one position can be smaller than the contact region 21 and can move within the contact region 21 during the actuation movement. When the operator desires to adjust a higher rotary speed than the rotary speed at idle and pivots for this purpose the throttle trigger 6, the contact section 43 is contacting the contact region 21 after overcoming an idle stroke. The idle stroke can serve in particular for compensating tolerances. When the throttle trigger lock 7 is already actuated (FIG. 1) and an accidental acceleration occurs, the idle stroke prevents an immediate actuation of the intermediate element 20. A further pivoting action of the throttle trigger 6 in the direction of arrow 40 has the effect that the contact section 43 is acting on the contact region 21 and thereby exerts a pulling force acting on the intermediate element 20. The pulling movement is acting in this context in the direction of arrow 46 in FIG. 2. Due to the spacing m of the pivot axis 25 of the intermediate element 20 relative to the axis of rotation 24 of the throttle element 23, the movement of the intermediate element 20 causes a rotation of the actuating element 15 about the axis of rotation 24. The movement of the intermediate element 20 effects opening of the throttle element 23 from its first end position 51 in the direction toward its second end position 52.

As also shown in FIG. 2, the intermediate element 20 has a blocking contour 56 adjacent to the actuating element 15. The blocking contour 56 in idle position and in a start position is located advantageously immediately adjacent to a nose 55 of the actuating element 15. The blocking contour 56 limits together with the nose 55 the path about which the intermediate element 20 can move in a direction extending from the contact region 21 toward the pivot axis 25 relative to the actuating element 15. In operation, the intermediate element 20 can be excited to perform movements relative to the actuating element 15 as a result of vibrations. These relative movements are limited by the blocking contour 56 and the nose 55. In this way, it is prevented that the movements of the intermediate element 20 become so great that the intermediate element 20 actuates and adjusts the actuating element 15.

The position of the contact region 21 of the intermediate element 20 is predetermined by the position of the pivot axis 25 on the actuating element 15 as well as by a guide structure 26. The guide structure 26 in the embodiment is designed as a slider guide and comprises a slider 29 which is secured fixedly on a flange 65 that is connected to the housing 30 of the carburetor 11. The slider 29 can advantageously also be secured immediately on the housing 30 of the carburetor 11. The guide structure 26 comprises also a guide path 28 which is embodied on the intermediate element 20 in the embodiment. It can also be provided that the slider 29 is formed on the intermediate element 20 and the guide path 28 on the housing 30 or on the flange 65. In each position of the throttle element 23, the slider 29 is positioned at a spacing relative to the pivot axis 25 of the intermediate element 20. The configuration of the guide path 28 in connection with the position of the pivot axis 25 determines the pivot position of the intermediate element 20 relative to the housing 30. The position of the contact region 21 can be adjusted by appropriate configuration of the guide path 28; this will be explained in the following in more detail.

Figure 3:
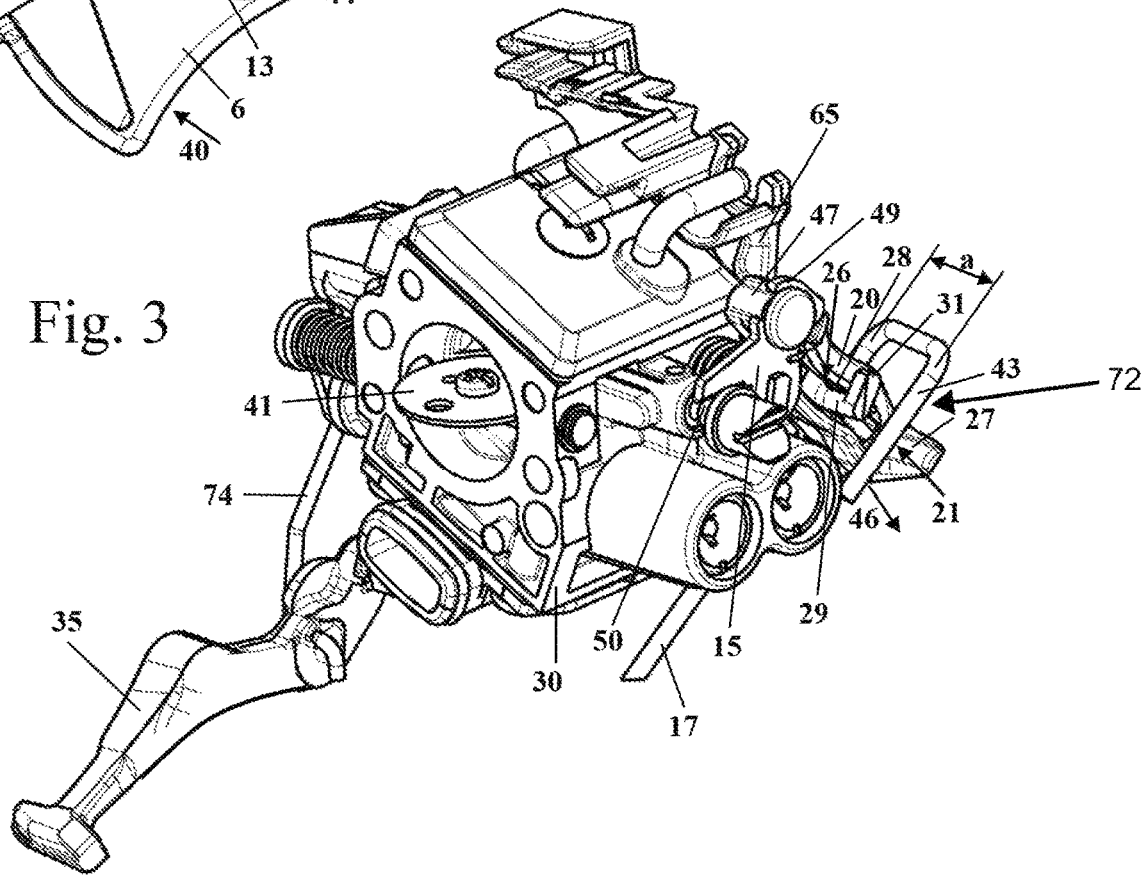
FIG. 3 is a perspective detail illustration of the arrangement of FIG. 2.

As shown in FIG. 3, the intermediate element 20 comprises a bearing pin 47 which is mounted in a receptacle 49 of the actuating element 15. The receptacle 49 is partially open at its periphery so that the bearing pin 47 can be mounted on the actuating element 15 and can be demounted therefrom; this will be explained in more detail in the following. As also shown in FIG. 3, the slider 29 comprises a securing section 31 that engages the intermediate element 20 at one side of the guide path 28 from behind and thereby secures it, in longitudinal direction of the slider 29, relative to the housing 30 and the flange 65. The securing section 31 prevents that the intermediate element 20 can be moved away from the housing 30 in the longitudinal direction of the slider 29.

As also shown in FIG. 3, the intermediate element 20 at the end which is facing away from the bearing pin 47 has a lateral projecting section 27 on which the contact region 21 is formed. The contact region 21 is arranged at the side of the section 27 which is facing the pivot axis 25 (FIG. 2).

The first end position 51 of the throttle element 23, as shown in FIG. 2, is determined by an idle stop 50 which is illustrated in FIG. 3. The idle stop 50 is advantageously formed on a conical section of a screw. The screw-in depth of the screw determines the first end position 51 of the throttle element 23 as a result of the conicity of the idle stop 50.

Figure 4:
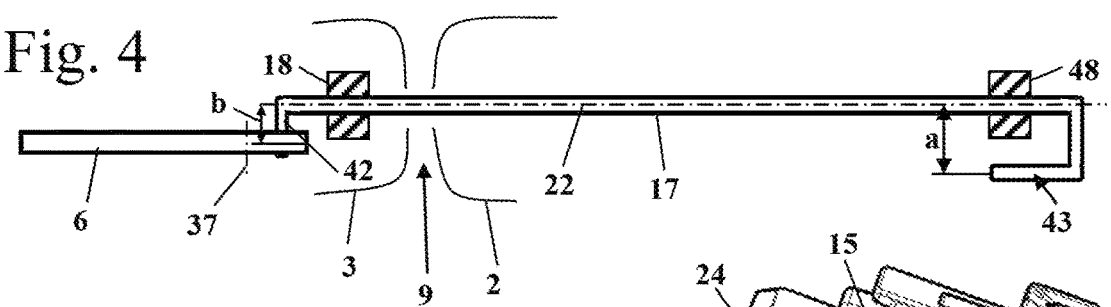
FIG. 4 is a schematic illustration of the arrangement of throttle trigger and coupling element.

FIG. 4 shows schematically the configuration of the coupling element 17. The throttle trigger 6 is acting on the actuation section 42 at a spacing b relative to the axis of rotation 22. When the throttle trigger 6 is pivoted, the rotary movement of the coupling element 17 about the axis of rotation 22 is thereby effected. The contact section 43 has a spacing a relative to the axis of rotation 22. Depending on the selected ratio of the spacings a and b, a smaller or a greater movement of the contact section 43 can be generated compared to the movement of the actuation section 42. In the embodiment, the spacing a is greater than the spacing b.

Figure 5:
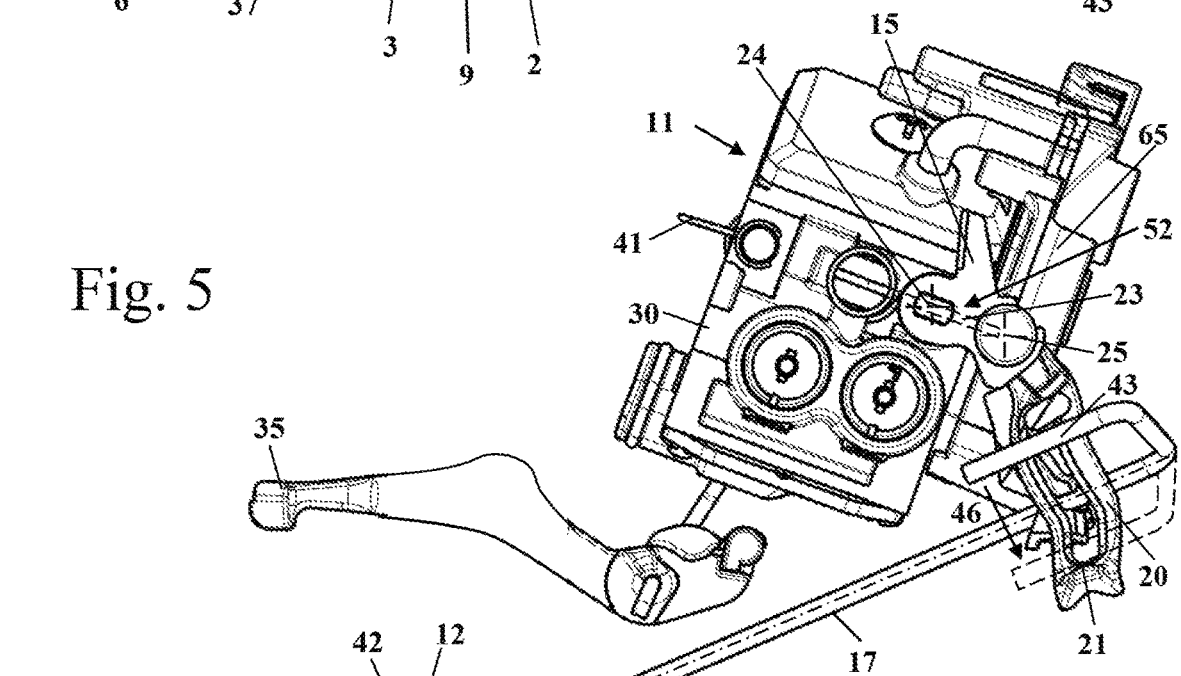
FIG. 5 shows the arrangement of FIG. 2 with completely open throttle element, wherein the throttle trigger and the coupling element are shown in both end positions.

FIG. 5 shows the arrangement for completely open throttle element 23. The throttle element 23 is in its second end position 52 which is correlated with the full load position. In order to move the intermediate element 20, the actuating element 15, and the throttle element 23 into this position, the throttle lever 6 is moved from the position illustrated in solid lines in FIG. 5 in the direction of arrow 40 into the position which is illustrated in dashed lines in FIG. 5. In doing so, the movement section 42 is moved in the direction of arrow 44. At the same time, the contact section 43 is adjusted from the position illustrated in solid lines in the direction of arrow 46 into the position illustrated in dashed lines. This causes the contact section 43 to push on the contact region 21 and to displace the intermediate element 20. The intermediate element 20 exerts on the actuating element 15 a pulling force which overcomes the spring force with which the actuating element 15 is pretensioned in the direction of the idle position; the pulling force pivots the actuating element 15 and thereby causes the throttle element 23 to open. In the embodiment, the actuating element 15 is fixedly connected with the throttle shaft 14. However, it can also be provided that the actuating element 15 is rotatable and connected in particular by a spring with the throttle shaft 14. Such a springy connection between actuating element 15 and throttle shaft 14 or throttle element 23 can be provided in particular for tolerance compensation.

In idle position in which the throttle element 23 is in its first end position 51 (FIG. 2), the intermediate element 20 is contacting the guide structure 26 and the mounting location on the actuating element 15. No forces are transmitted by means of the intermediate element 20.

For mounting the intermediate element 20, it is provided that the intermediate element 20 can be mounted on the actuating element 15 or demounted from the actuating element 15 only when the actuating element 15 and the intermediate element 20 are in the position which is correlated with the second end position 52 of the throttle element 23. This position is shown in FIG. 5. In usual operation, the contact section 43 in this position is pushing on the contact region 21 of the intermediate element 20 and the intermediate element 20 is pulling on the actuating element 15 in order to maintain the throttle element 23 in its position. In this position, an accidental detachment of the intermediate element 20 from the actuating element 15 is not possible due to the forces that are transmitted by the arrangement. In order to detach the intermediate element 20 from the actuating element 15, the throttle element 23 must be maintained in its completely open position, i.e., in the second end position 52. At the same time, the throttle trigger 6 must be released so that the contact section 43 does not contact the contact region 21 and no forces are transmitted by the intermediate element 20. This is the position that is shown in FIG. 5 in solid lines.

Figure 6:
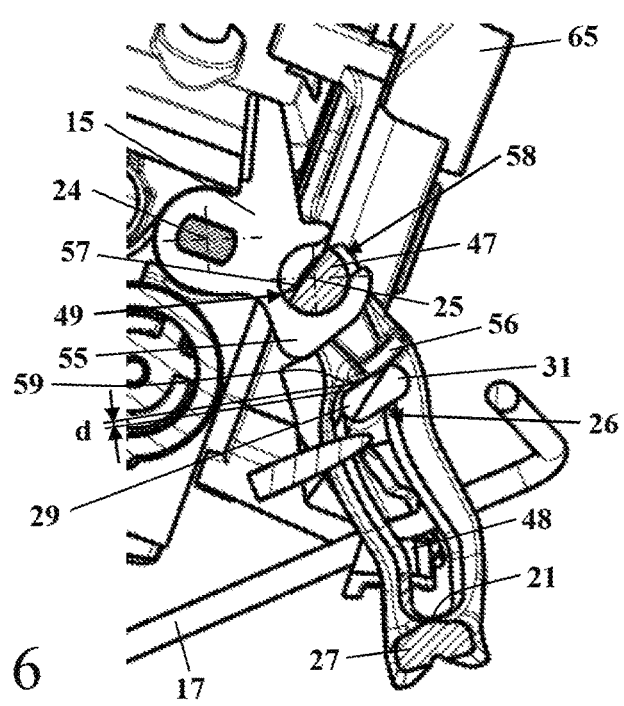
FIG. 6 is a detail section illustration of the intermediate element in the position of FIG. 5.
Figure 7:
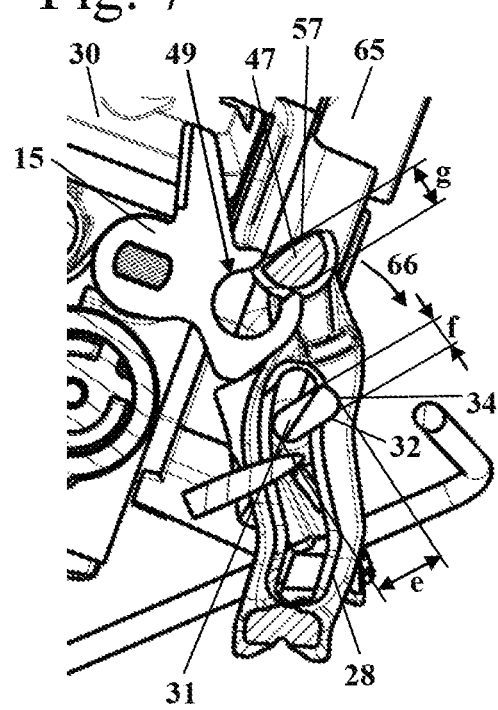
FIG. 7 shows the arrangement of FIG. 6 in a first position of detaching and demounting the intermediate element.
Figure 8:
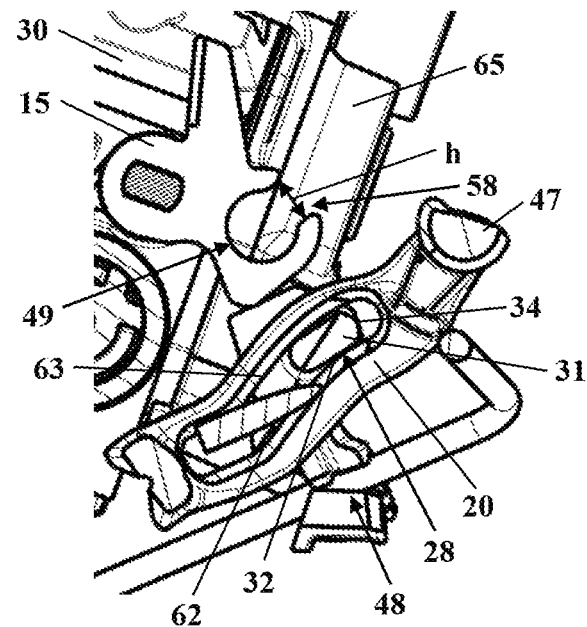
FIG. 8 shows the arrangement of FIG. 6 in a second position of detaching and demounting the intermediate element.

As illustrated in the section illustration of FIG. 6, the bearing pin 47 of the intermediate element 20 has a flat portion 57 provided on the otherwise circular cross-section. The receptacle 49 has an opening 58 which is arranged on the side of the receptacle 49 facing away from the contact region 21. In operation, the intermediate element 20 is thus pushed away from the opening 58 into the receptacle 49, due to the forces transmitted through the intermediate element 20 to the actuating element 15. From this position, the intermediate element 20, as shown in FIGS. 7 and 8, can be moved with its bearing pin 47 through the opening 58. At the flat portion 57, the bearing pin 47 has its smallest width g which is slightly smaller than the width of the opening 58. The greatest diameter of the bearing pin 47 is however greater than the width of the opening 58 so that detachment of the intermediate element 20 is possible only in the position illustrated in FIGS. 6 to 8.

Figure 11:
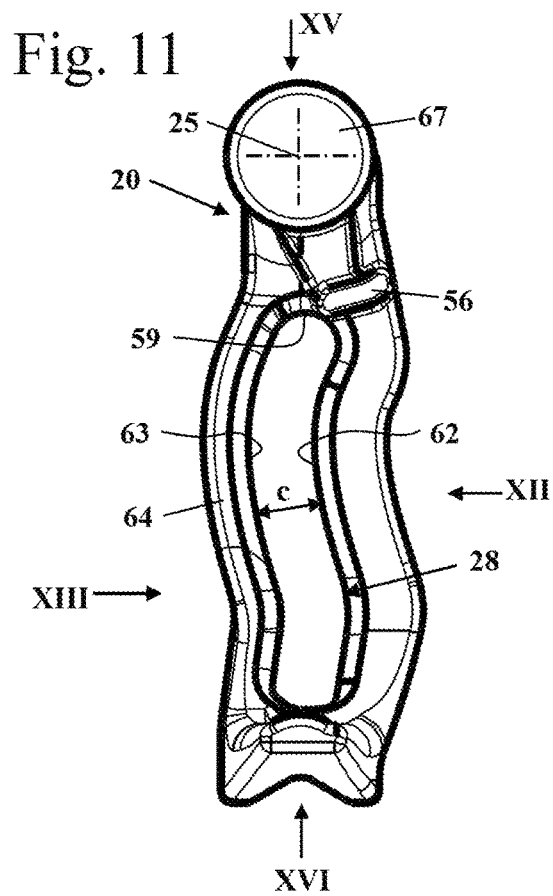
FIG. 11 is a side view of the intermediate element.

As shown in FIG. 7, the securing section 31 has a long side 32 that has a length e as well as a short side 34 that has a length f. The length f is significantly smaller than the length e. The length e is greater than the width c of the guide path 28 which is indicated in FIG. 11. As long as the long side 32 is positioned transverse to the longitudinal direction of the guide path 28, the intermediate element 20 therefore cannot be detached from the slider 29. In order to demount the intermediate element 20 completely, the intermediate element 20, as indicated in FIG. 7 by arrow 66, must be pivoted until the long side 32 is positioned parallel to the longitudinal direction of the guide path 28. This position is illustrated in FIG. 8. In this position of the intermediate element 20, the two long sides 32 of the securing section 31 each are approximately parallel to the longitudinal sides 62 and 63 of the guide path 28. The length f of the short side 34 is smaller than the width c of the guide path 28. The short side 34 is oriented parallel to the width c of the guide path 28. In this position, the intermediate element 20 can be removed from the slider 29 in the direction away from the housing 30 of the carburetor 11. FIG. 8 also shows the width h of the opening 58 which is only slightly greater than the smallest width g of the bearing pin 47.

As shown in FIG. 6, the slider 29 in the end position 52 of the throttle element 23 has a spacing d relative to the first end 59 of the guide path 28. The spacing d can be comparatively small and can amount, for example, to 0.5 mm to 10 mm, in particular 1 mm to 5 mm. Since in the second end position 52 the spacing d is provided between the slider 29 and the first end 59 of the guide path 28, contaminants of the guide path 28 can be pushed out of the movement range of the slider 29 in the guide path 28. Even when contaminants are present, the throttle element 23 can reach its second end position 52. In the second end position 52, the slider 29 has the smallest spacing d relative to the first end 59.

FIGS. 5 to 8 show side views in the direction of the axis of rotation 24 of the throttle element 23. As shown in FIG. 6, the guide path 28 (FIG. 7) describes an arc which is oppositely oriented to the arc that is described by the receptacle 49 during the actuation movement about the axis of rotation 24 of the throttle element 23. When in operation the coupling element 17 moves due to vibrations and/or due to forces which are acting in operation on the motor chainsaw 1, no actuation movement, or no additional actuation movement, is produced in this way on the intermediate element 20. Upon movement of the throttle trigger 6 relative to the carburetor 11 in upward direction or downward direction in the illustration of FIG. 5 by a corresponding movement of the handle 3 (see FIG. 1), the coupling element 17 moves in longitudinal direction of the second rotary bearing 48 and/or transverse to the axis of rotation 22 (FIG. 2) about the second rotary bearing 48. Lateral relative movements of handle 3 and carburetor 11 are possible also without this causing additional actuation of the intermediate element 20. Due to the orientation of the contact region 21, a good transmission behavior of the actuation movement of the throttle trigger 6 to the throttle element 23 is achieved. As also shown in FIG. 6, the blocking contour 56 in the embodiment extends in an arc shape, in particular in a circular arc shape, about the pivot axis 25 of the intermediate element 20.

Figure 9:
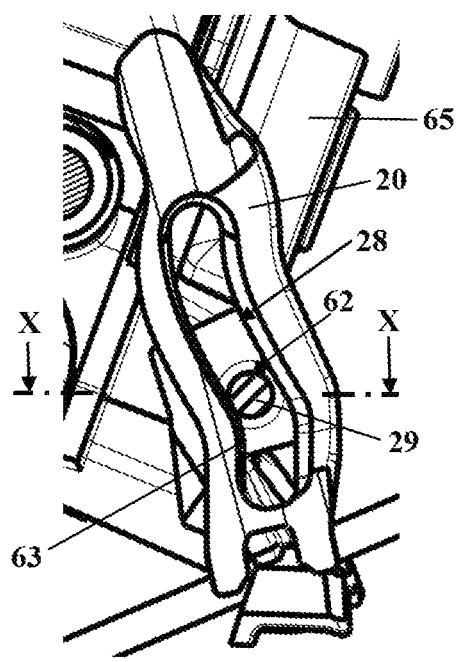
FIG. 9 is a partial section view of the intermediate element in the arrangement of FIG. 6.
Figure 10:
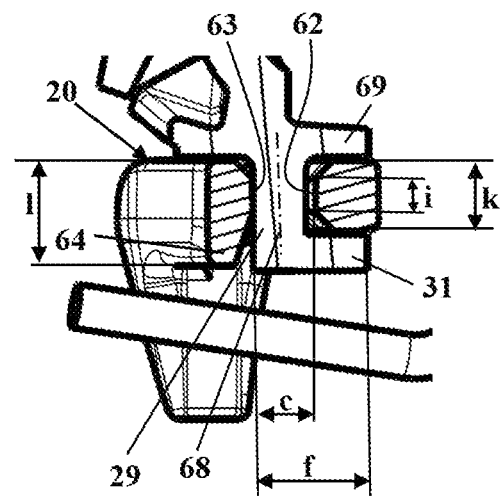
FIG. 10 is an enlarged detail section illustration along the line X-X of FIG. 9.

FIGS. 9 and 10 show the arrangement of the slider 29 in the guide path 28. As shown in FIG. 9, the slider 29 has clearance between the longitudinal sides 62 and 63 of the guide path 28. The longitudinal sides 62 and 63 are the sides of the guide path 28 between which the slider 29 is guided. As shown in FIG. 10, the slider 29 is contacting by a linear contact surface one of the longitudinal sides 62 or 63. This is the result of the circular cross section of the slider 29 and the width i of the longitudinal sides 62 and 63. The width i is measured parallel to the longitudinal center axis 68 of the slider 29. The longitudinal sides 62 and 63 extend in the region that has the width i parallel to the longitudinal center axis 68 of the slider 29. Preferably, the width i amounts to at least 0.5 mm and at most 4 mm, in particular at least 1 mm and at most 3 mm, preferably at least 2 mm. A width i of the longitudinal sides 62 and 63 of at most 4 mm enables good removal of contaminants from the guide path 28 by means of the slider 29. A width i of at least 0.5 mm, in particular at least 1 mm, ensures good guiding properties. As also shown in FIG. 10, on the side of the longitudinal side 63 which is facing the securing section 31, an elevation 64 (see also FIGS. 12, 13) is provided on the longitudinal side 63 and faces away from the housing 30 (FIG. 5). At the longitudinal side 63 the intermediate element 20 has a width l which is significantly greater than the width k at the longitudinal side 62. The width l and the width k are measured in this context in the same direction. In the embodiment, the elevation 64 projects exclusively toward the side which is facing away from the housing 30 of the carburetor 11. A different configuration of the elevation 64 can be advantageous. As also shown in FIG. 10, the intermediate element 20 is positioned on the side facing the housing 30 (FIG. 8) on a contact surface 69 which is formed as one piece together with the flange 65.

Figure 12:
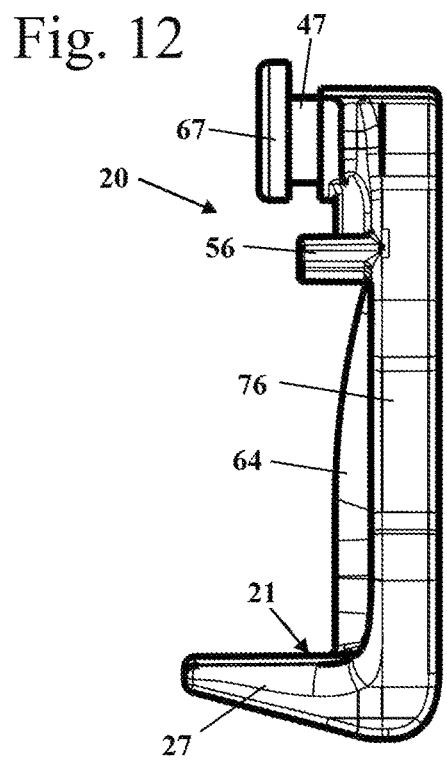
FIG. 12 is a side view in the direction of arrow XII of FIG. 11.

FIGS. 11 to 17 show the configuration of the intermediate element 20 in detail. In FIG. 11, the arc-shaped course of the blocking contour 56 is illustrated. As also shown in FIG. 11, the longitudinal sides 62 and 63 of the guide path 28 are positioned at a constant spacing c relative to each other. The first end 59 of the guide path 28 is the end which is facing the pivot axis 25. As shown in FIGS. 11 and 12, the bearing pin 47 has a head 67 with an enlarged outer diameter. The head 67 is arranged on the side of the bearing pin 47 which is facing away from the housing 30 and secures the position of the intermediate element 20 on the actuating element 15 in the direction of the pivot axis 25.

Figure 13:
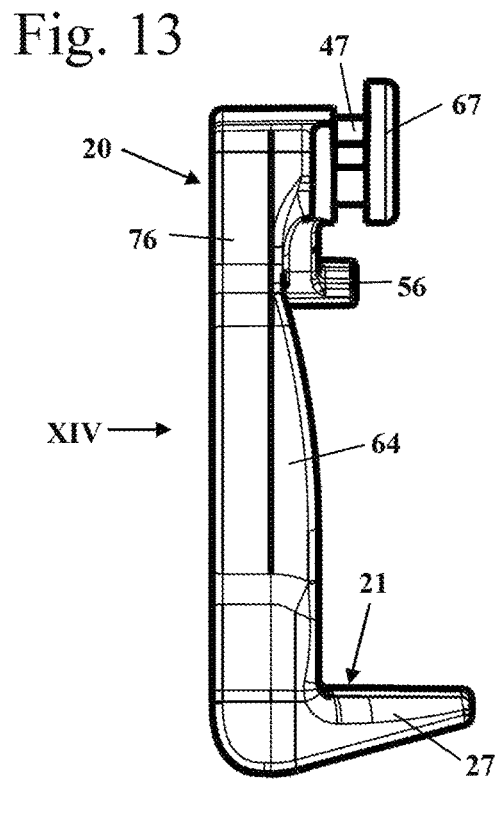
FIG. 13 is a side view in the direction of arrow XIII of FIG. 11.
Figure 14:
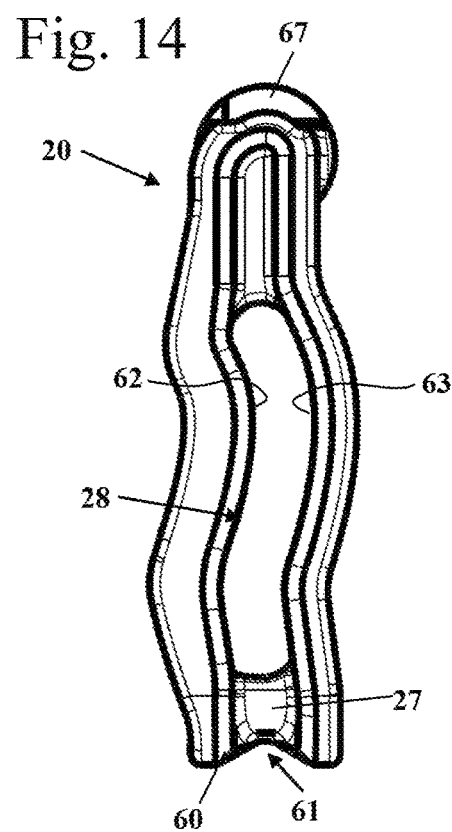
FIG. 14 is a side view in the direction of arrow XIV of FIG. 13.
Figure 15:
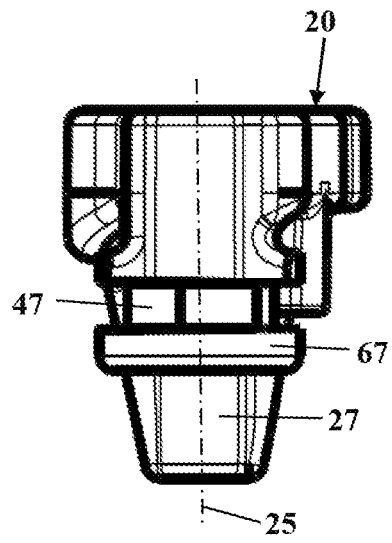
FIG. 15 is a side view in the direction of arrow XV of FIG. 11.
Figure 16:
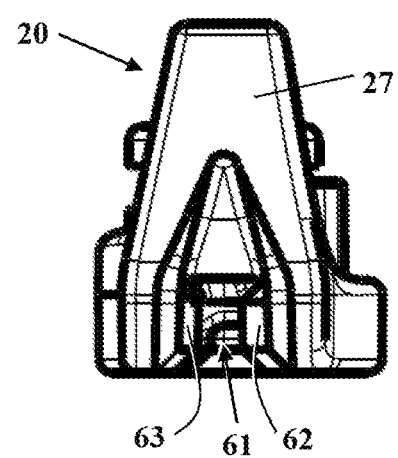
FIG. 16 is a side view in the direction of arrow XVI of FIG. 11.
Figure 17:
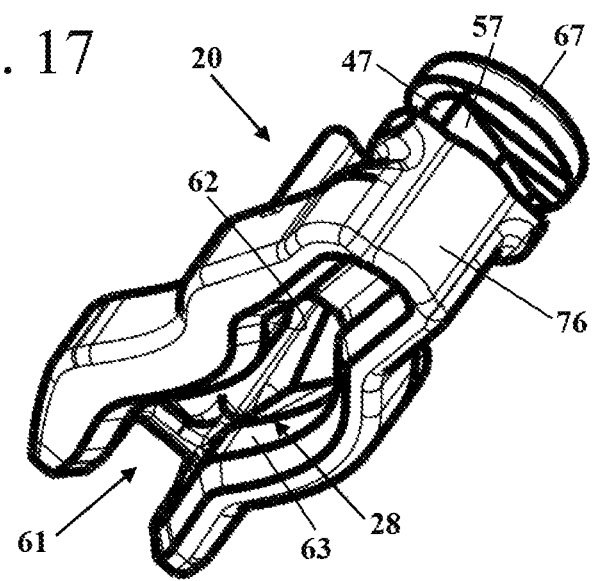
FIG. 17 is a perspective illustration of the intermediate element.

In FIGS. 12 and 13, the elevation 64 can be seen also. As shown in FIGS. 12 and 13, the width of the elevation 46 increases at the end facing the bearing pin 47 with increasing spacing away from the bearing pin 47. As shown in FIG. 14, the guide path 28 has a second end 60 which is facing away from the pivot axis 25 (FIG. 11). As also shown in FIG. 16, the guide path 28 is at least partially open toward the second end 60 (FIG. 14) and comprises an opening 61 at this end. The stability of the intermediate element 20 is still provided because the lateral projecting section 27 connects the two longitudinal sides 62 and 63 to each other. Contaminants can be discharged from the guide path 28 through the opening 61. In the usual position of the motor chainsaw 1, the opening 61 is advantageously arranged at the bottom so that contaminants can drop down, also due to the weight force. The guide path 28, as shown in particular in FIG. 14, is thus approximately U-shaped. This can also be seen in FIG. 17. In FIG. 17, the flat portion 57 on the bearing pin 47 is illustrated also which is formed between the base member 76 of the intermediate element 20 and the head 67. Adjacent to the bearing pin 47, the base member 76 is also provided with a greater extension transverse to the pivot axis 25 than the bearing pin 47 (FIG. 15). The intermediate element 20 thus cannot be demounted in the direction of the pivot axis 25 from the actuating element 15 or mounted on the actuating element 15. The base member 76 is the region of the intermediate element 20 where the guide path 28 is formed. The lateral projecting section 27 is projecting away from the base member 76. The base member 76 is approximately designed in a hairpin shape, as shown in FIG. 14. A different configuration can be advantageous however. The bearing pin 47 and the lateral projecting section 27 project to the same side of the base member 76, as illustrated in FIG. 13.

The specification incorporates by reference the entire disclosure of European priority document 16 400 049.9 having a filing date of Oct. 31, 2016.

While specific embodiments of the invention have been shown and described in detail to illustrate the inventive principles, it will be understood that the invention may be embodied otherwise without departing from such principles.

What is claimed is:

1. A hand-guided power tool comprising:
    a drive motor;
    a tool driven by the drive motor;
    at least one handle that is operatively connected across a vibration gap to the drive motor so as to be vibration-decoupled from the drive motor;
    an actuating device arranged on the at least one handle and configured to actuate a throttle element of the drive motor, wherein the throttle element is arranged in a housing and is pivotably supported on a first axis of rotation in the housing;
    a coupling element operatively connecting the actuating device to the throttle element, wherein the coupling element bridges the vibration gap and transmits an actuation movement of the actuation device as a rotary movement about a second axis of rotation that is arranged transverse to the vibration gap;
    an actuating element connected to the throttle element;
    an intermediate element pivotably supported about a pivot axis on the actuating element, wherein the coupling element is acting on the intermediate element and wherein the coupling element, over at least part of the actuation movement of the actuation device, contacts a contact region of the intermediate element;
    a guide structure configured to guide the intermediate element, wherein the guide structure is a slider guide and comprises a guide path and a slider guided in the guide path, wherein the guide path and the slider form a first guide part and a second guide part, wherein the first guide part is connected fixedly and non-rotatably to the housing of the throttle element, and wherein the intermediate element comprises the second guide part;
    wherein the guide structure is configured to change a position of the contact region of the intermediate element relative to the housing as a function of a rotational position of the actuating element by changing a pivot position of the intermediate element relative to the housing.

2. The power tool according to claim 1, wherein the guide structure attributes to each position of the pivot axis of the intermediate element at the actuating element a rotational position of the intermediate element about the pivot axis.

3. The power tool according to claim 1, wherein the intermediate element comprises a lateral projecting section, wherein the coupling element is contacting a side of the lateral projecting section which is facing the pivot axis of the intermediate element.

4. The power tool according to claim 1, wherein the throttle element is pivotably supported on the first axis of rotation to be movable between a first end position of the throttle element and a second end position of the throttle element.

5. The power tool according to claim 4, wherein the coupling element is rotatably supported in a rotary bearing which is fixedly connected to the housing.

6. The power tool according to claim 4, wherein the slider, in at least one of the first end position and the second end position of the throttle element, has a spacing relative to a correlated end of the guide path that is correlated with the at least one of the first end position and the second end position of the throttle element.

7. The power tool according to claim 4, wherein the slider comprises a securing section, wherein the securing section engages behind a first longitudinal side of the guide path and secures the guide path in a direction of the pivot axis of the intermediate element on the slider.

8. The power tool according to claim 4, wherein the slider is contacting a contact line on the guide path.

9. The power tool according to claim 4, wherein the intermediate element is configured to be connected to the actuating element only when the intermediate element and the actuating element are in a position which is correlated with the second end position of the throttle element, wherein the second end position of the throttle element is a completely open position of the throttle element.

10. The power tool according to claim 4, wherein the first end position of the throttle element is a closed position of the throttle element, wherein the intermediate element comprises a blocking contour which, in the first end position of the throttle element, interacts with the actuating element and limits a movement of the intermediate element in a direction extending from the contact region toward the pivot axis of the intermediate element.

11. A hand-guided power tool comprising:
    a drive motor;
    a tool driven by the drive motor;
    at least one handle that is operatively connected across a vibration gap to the drive motor so as to be vibration-decoupled from the drive motor;
    an actuating device arranged on the at least one handle and configured to actuate a throttle element of the drive motor, wherein the throttle element is arranged in a housing and is pivotably supported on a first axis of rotation in the housing;
    a coupling element operatively connecting the actuating device to the throttle element, wherein the coupling element bridges the vibration gap and transmits an actuation movement of the actuation device as a rotary movement about a second axis of rotation that is arranged transverse to the vibration gap;
    an actuating element connected to the throttle element;
    an intermediate element pivotably supported about a pivot axis on the actuating element, wherein the coupling element is acting on the intermediate element and wherein the coupling element, over at least part of the actuation movement of the actuation device, contacts a contact region of the intermediate element;
a guide structure configured to guide the intermediate element, wherein the guide structure is configured to change a position of the contact region of the intermediate element relative to the housing as a function of a rotational position of the actuating element by changing a pivot position of the intermediate element relative to the housing;
wherein the throttle element is pivotably supported on the first axis of rotation to be movable between a first end position of the throttle element and a second end position of the throttle element;
wherein the guide structure is a slider guide and comprises a guide path and a slider guided in the guide path;
wherein the slider comprises a securing section, wherein the securing section engages behind a first longitudinal side of the guide path and secures the guide path in a direction of the pivot axis of the intermediate element on the slider;
wherein the guide path has a longitudinal direction and a width measured transverse to the longitudinal direction, wherein the securing section comprises a first long side and a second short side, wherein the first long side has a first length greater than the width of the guide path, wherein the second short side has a second length smaller than the width of the guide path, and wherein, in no position of the intermediate element between the first end position of the throttle element and the second end position of the throttle element, the second short side is oriented perpendicular to the longitudinal direction of the guide path.

12. A hand-guided power tool comprising:
a drive motor;
a tool driven by the drive motor;
at least one handle that is operatively connected across a vibration gap to the drive motor so as to be vibration-decoupled from the drive motor;
an actuating device arranged on the at least one handle and configured to actuate a throttle element of the drive motor, wherein the throttle element is arranged in a housing and is pivotably supported on a first axis of rotation in the housing;
a coupling element operatively connecting the actuating device to the throttle element, wherein the coupling element bridges the vibration gap and transmits an actuation movement of the actuation device as a rotary movement about a second axis of rotation that is arranged transverse to the vibration gap;
an actuating element connected to the throttle element;
an intermediate element pivotably supported about a pivot axis on the actuating element, wherein the coupling element is acting on the intermediate element and wherein the coupling element, over at least part of the actuation movement of the actuation device, contacts a contact region of the intermediate element;
a guide structure configured to guide the intermediate element, wherein the guide structure is configured to change a position of the contact region of the intermediate element relative to the housing as a function of a rotational position of the actuating element by changing a pivot position of the intermediate element relative to the housing;
wherein the guide structure is a slider guide and comprises a guide path and a slider guided in the guide path;
wherein the slider comprises a securing section, wherein the securing section engages behind a first longitudinal side of the guide path and secures the guide path in a direction of the pivot axis of the intermediate element on the slider;
wherein the guide path comprises a second longitudinal side and wherein an elevation is arranged on the guide path adjacent to the second longitudinal side.

* * * * *